US011920824B2

(12) United States Patent
Bauer et al.

(10) Patent No.: US 11,920,824 B2
(45) Date of Patent: Mar. 5, 2024

(54) HUMIDIFYING DEVICE FOR TRANSFERRING WATER FROM WASTE AIR OF A WASTE AIR FLOW TO SUPPLY AIR OF A SUPPLY AIR FLOW

(71) Applicant: MAHLE International GmbH, Stuttgart (DE)

(72) Inventors: Swen-Juri Bauer, Stuttgart (DE); Andreas Gruener, Hattenhofen (DE); Stefan Kaiser, Remseck (DE); Aleksandar Radlovic, Stuttgart (DE); Lukas Schikora, Esslingen (DE); Alexander Tuntukas, Stuttgart (DE)

(73) Assignee: Mahle International GmbH, Stuttgart (DE)

( * ) Notice: Subject to any disclaimer, the term of this patent is extended or adjusted under 35 U.S.C. 154(b) by 239 days.

(21) Appl. No.: 17/342,478

(22) Filed: Jun. 8, 2021

(65) Prior Publication Data

US 2021/0381704 A1 Dec. 9, 2021

(30) Foreign Application Priority Data

Jun. 8, 2020 (DE) .................... 10 2020 207 147.0

(51) Int. Cl.
| | |
|---|---|
| *F24F 6/00* | (2006.01) |
| *F24F 11/00* | (2018.01) |
| *F24F 12/00* | (2006.01) |
| *F24F 7/00* | (2021.01) |
| *F24F 110/22* | (2018.01) |

(52) U.S. Cl.
CPC ............ *F24F 6/00* (2013.01); *F24F 11/0008* (2013.01); *F24F 12/002* (2013.01); *F24F 2006/006* (2013.01); *F24F 2007/001* (2013.01); *F24F 2110/22* (2018.01)

(58) Field of Classification Search
CPC ........ Y02E 60/50; Y02T 90/40; H01M 8/248; H01M 8/2475; H02G 15/003; H01R 13/5216
See application file for complete search history.

(56) References Cited

U.S. PATENT DOCUMENTS

| | | | | |
|---|---|---|---|---|
| 6,190,793 | B1 * | 2/2001 | Barton .................. | H01M 8/242 |
| | | | | 429/511 |
| 7,344,797 | B2 * | 3/2008 | Rock ..................... | H01M 8/248 |
| | | | | 429/469 |
| 9,859,575 | B2 | 1/2018 | Fasold et al. | |
| 10,090,551 | B2 * | 10/2018 | Suh ........................ | H01M 8/248 |

(Continued)

FOREIGN PATENT DOCUMENTS

| | | |
|---|---|---|
| DE | 102012024963 A1 | 6/2014 |
| DE | 102013020503 A1 | 6/2015 |
| DE | 102016004306 A1 | 10/2017 |

*Primary Examiner* — Lionel Nouketcha
(74) *Attorney, Agent, or Firm* — Ewers IP Law PLLC; Falk Ewers (57) ABSTRACT

A humidifying device for transferring water and/or water vapour from waste air of a waste air flow to supply air of a supply air flow is provided. In the compensating chamber of the housing of the humidifying device, at least one spreading means is arranged, which spreads apart the plate stack of the humidifying device and the housing cover closing the housing in the direction of the longitudinal axis.

11 Claims, 4 Drawing Sheets

(56) References Cited

U.S. PATENT DOCUMENTS

| | | | | |
|---|---|---|---|---|
| 2005/0164077 A1* | 7/2005 | Bacon | ............... | H01M 8/248 |
| | | | | 429/511 |
| 2009/0004533 A1* | 1/2009 | Tanaka | ............ | H01M 8/2483 |
| | | | | 429/481 |
| 2009/0220848 A1* | 9/2009 | Yang | ............... | H01M 8/0204 |
| | | | | 429/444 |
| 2018/0375144 A1* | 12/2018 | Tingelöf | ............ | H01M 8/248 |
| 2020/0036031 A1* | 1/2020 | Ohmori | ............ | H01M 8/247 |
| 2020/0144651 A1* | 5/2020 | Hemmer | ............ | H01M 8/248 |

* cited by examiner

HUMIDIFYING DEVICE FOR TRANSFERRING WATER FROM WASTE AIR OF A WASTE AIR FLOW TO SUPPLY AIR OF A SUPPLY AIR FLOW

CROSS REFERENCE TO RELATED APPLICATIONS

This application claims priority to German patent application DE 10 2020 207 147.0, filed Jun. 8, 2020, the entire content of which is incorporated herein by reference.

TECHNICAL FIELD

The disclosure relates to humidifying devices for transferring water and/or water vapour from waste air of a waste air flow to supply air of a supply air flow.

BACKGROUND

A generic humidifying device is described in the document DE 10 2013 020 503 A1, wherein the same in a housing comprises a plate stack with water vapour permeable membranes, which are arranged between or on individual plates. The housing comprises columns for holding the plate stack, wherein the connection between columns and the individual plates takes place via laterally protruding connecting lugs, which project into a receiving groove. Disadvantageous, in this shape is that the plate stack built-up out of the individual plates is relatively difficult to produce with dimensional and shape accuracy, so that this can only positioned and adequately fixed in the housing with sufficient accuracy with relatively major expenditure.

SUMMARY

It is therefore an object of the disclosure to improve or at least provide another embodiment of a humidifying device. Attempts are to be made in particular to offset the dimensional and shape inaccuracies of the plate stack that arise during the manufacture.

In the present disclosure, this object is achieved by a humidifying device for transferring water from waste air of a waste air flow to supply air of a supply air flow as described herein.

A basic idea of the disclosure lies in offsetting the dimensional and shape inaccuracies of the plate stack through a spreading means automatically equalising differences in length.

For this purpose, a humidifying device for transferring water and/or water vapour from waste air of a waste air flow to supply air of a supply air flow, in particular for a fuel cell, is provided, which comprises a plate stack having a longitudinal extent along a longitudinal axis. This plate stack has individual plates that are separate and are touchingly and congruently stacked onto one another in the direction of the longitudinal axis. The individual plates in turn each comprise a fluid-permeable membrane for transferring water and/or water vapour from waste air enriched with water and/or water vapour of a waste air flow to supply air to be enriched with water and/or water vapour of a supply air flow. Furthermore, it is provided that the humidifying device is equipped with a housing that forms at least one housing opening, practically two housing openings. In the assembled state of the humidifying device, the plate stack is completely inserted into the housing through one of these housing openings. The respective or all housing openings are sealed completely, i.e., fluid-tightly by at least one housing cover. According to an aspect of the disclosure, a compensating chamber is formed in the direction of the longitudinal axis between the housing cover and the plate stack, in which at least one, preferentially exactly one single spreading means is arranged, which spreads the plate stack and the housing cover apart, in the direction of the longitudinal axis. By the spreading apart, i.e., through an automatic change in length of the spreading means, dimensional and shape inaccuracies that occur in particular in the direction of the longitudinal axis during the manufacture of the individual plates and/or the assembling of the individual plates to form the plate stack, in particular height dimension deviations of the individual plates or of the plate stack, can be offset. What is referred to as height dimension deviation can be considered as difference between the planned standard dimension of an individual plate or of the plate stack and the actually achieved actual dimension. In practice, these dimensional and shape inaccuracies, in particular the height dimension deviation, can amount to some micrometres up to some millimetres. By offsetting these, the plate stack can be advantageously positioned and fixed relatively easily in the housing.

With respect to the longitudinal axis, the spreading means can fix the plate stack in a non-positive and positive-locking manner. By fixing the plate stack in the longitudinal direction, it can be advantageously achieved, besides the offsetting of the dimensional and shape inaccuracies, that the plate stack, in particular with respect to the housing and/or of the housing cover, is practically immovable or immovable. Further fixing means for fixing the plate stack can therefore be omitted, which further improves the assembly friendliness of the humidifying device according to the disclosure.

Practically, the spreading means can non-positively and positively support itself on the plate stack and/or on the housing cover. Thus, the spreading means touchingly supports itself on the plate stack and/or on the housing cover. By way of this, the spreading means is relatively favourably arranged within the housing of the humidifying device.

Further practically, the spreading means can be integrally embodied with the plate stack and/or with the housing cover. By way of this, the plate stack and/or the housing cover can form a one-piece assembly unit with the spreading means, which favours for example the assembly of the humidifying device.

It is practical, furthermore, when the spreading means, with respect to the housing, with respect to the plate stack and with respect to the housing cover forms a separate individual component. By way of this, the respective spreading means is a separate individual part, which can be for example favourably replaced or provided by an external supplier.

In particular, the mentioned compensating chamber can be framed, transversely to the longitudinal axis, by a surrounding housing portion of the housing at least in sections. Here, the spreading means can support itself on the respective housing portion and practically on the housing cover and/or on the plate stack in a non-positive and positive-locking manner.

Practically, the spreading means can comprise a separate compression spring touchingly supporting itself on the housing cover, in particular a helical compression spring, a separate sealing plate and a separate plate seal. The compression spring practically extends in the direction of the longitudinal axis through the compensating chamber and touchingly supports itself on the sealing plate, wherein the sealing plate, with the compensating chamber, is moveably mounted on the housing in the direction of the longitudinal axis from the inside. On its side facing away from the compression spring, the sealing plate caries the plate seal which subjected to force by the compression spring touchingly lies on the plate stack in order to thus seal the plate stack against the compensating chamber. This has the advantage that the plate stack is preloaded by the spring in the direction of the longitudinal axis and in particular that the compensating chamber with respect to the plate stack, in particular regarding the waste air of the waste air flow and the supply air of the supply air flow, is fluidically separated. Thus, waste air and/or air cannot enter the compensating chamber. Practically, the compression spring is embodied integrally with the housing cover.

Further practically, the spreading means can comprise at least one leaf spring embodied integrally with the housing cover, a separate sealing plate and a separate plate seal, wherein the at least one leaf spring extends angularly, in particular at an angle of 45°, with respect to the longitudinal axis, through the compensating chamber towards the sealing plate. Because of this, the leaf spring can touchingly support itself on the sealing plate. Within the compensating chamber, the sealing plate is slide-moveably or moveably mounted from the inside on the housing in the direction of the longitudinal axis. On a side facing away from the spring, the sealing plate carries the plate seal which, subjected to force by the leaf spring, touchingly lies on the plate stack in order to seal the plate stack against the compensating chamber. This also has the advantage that the plate stack is preloaded by the spring in the direction of the longitudinal axis and in particular that the compensating chamber, with respect to the plate stack, in particular with respect to the waste air of the waste air flow and the supply air of the supply air flow, is fluidically separated. Thus, waste air and/or supply air cannot enter the compensating chamber.

Practically, the sealing plate can be formed by a pot body, which has a round or square pot base. The same is framed by a pot wall surrounding the pot base completely or at least in sections, which pot wall projects from the pot base at a right angle or angularly. The plate seal is realised through a flat round or square gasket that is formed in one piece and in terms of area is congruently formed with the pot base. The plate seal can for example be glued to or welded to the sealing plate.

Further practically, the spreading means can comprise a separate hose seal, a separate sealing plate and a separate plate seal, where in the hose seal touching supports itself on the housing cover and on the housing. Furthermore, the hose seal runs transversely with respect to the longitudinal axis completely around about the same. It is provided, furthermore, that the hose seal extends in the direction of the longitudinal axis through the compensating chamber and is touchingly supported on the sealing plate. Within the compensating chamber, the sealing plate is slide-moveably or moveably mounted on the housing in the direction of the longitudinal axis from the inside. On a side facing away with respect to the house seal, the sealing plate carries the plate seal, wherein this plate seal, subjected to force by the hose seal, touchingly lies on the plate stack in order to seal the plate stack against the compensating chamber. It is conceivable that the hose seal is individually inserted during the assembly of the humidifying device. This also has the advantage that the plate stack is preloaded in the direction of the longitudinal axis and in particular that the compensating chamber, with respect to the plate stack, in particular with respect to the waste air of the waste air flow and the supply air of the supply air flow, is fluidically separated. Thus, waste air and/or supply air cannot enter the compensating chamber.

Practically, the spreading means can be formed from a cured solid sealant, a separate sealing plate and a separate plate seal. Here, the housing has at least one clear filling opening through which the uncured liquid sealing means flows or can flow into the compensating chamber, wherein the uncured liquid sealant practically completely or completely fills up the compensating chamber, so that on the one hand it is touchingly arranged on the sealing plate that is arranged within the compensating chamber and on the other hand on the housing cover and on the housing. The flowed-in uncured liquid sealant is volume-expandingly cured, so that the cured sealant can subject to pressure force and spread apart the sealing plate and the housing cover in the direction of the longitudinal axis, wherein the plate seal is arranged on the sealing plate. The sealant can be formed by a foam or by a silicone and in particular swell up during curing. Furthermore, the mentioned filling opening can be either sealed by a separate plug or preferably sealed by the cured sealant itself. Furthermore, the sealing plate and the plate seal can be embodied as integral assembly unit which, prior to the final assembly of the humidifying device, can be glued to the plate stack, as a result of which the final assembly of the humidifying device is simplified. This also has the advantage that the plate stack is preloaded in the direction of the longitudinal axis by the volume-expanded sealing means and, in particular, that the compensating chamber, with respect to the plate stack, in particular with respect to the waste air of the waste air flow and the supply air of the supply air flow, is fluidically separated. Thus, waste air and/or supply air cannot enter the compensating chamber.

Furthermore, it can be provided that the housing, with respect to the longitudinal axis, has a square or round housing cross section that is constant in terms of area in the direction of the longitudinal axis. Obviously, other housing cross sections are also conceivable. Additionally, it can be advantageous when the mentioned membranes of the humidifying device are oriented parallel to one another and spaced apart from one another in the direction of the longitudinal axis. Practically, the humidifying device comprises at least two membranes that in practice a plurality of membranes will be employed in a single humidifying device.

Practically, the housing cover can be formed by a round or square flat rim part with a central projecting cover curvature, wherein the cover curvature and the flat rim part delimit a curvature volume, wherein the housing cover in the assembled state of the humidifying device is arranged on the housing so that the cover curvature projects away from the housing in the direction of the longitudinal axis and that the curvature volume enlarges the volume of the compensating chamber. Furthermore, the housing cover in the assembled state of the humidifying device can be arranged on the housing so that the cover curvature projects towards the plate stack in the direction of the longitudinal axis and that the curvature volume diminishes the volume of the compensating chamber.

Another basic idea of the disclosure, which can be realised additionally or alternatively to the basic idea mentioned further up can lie in providing a humidifying device for transferring water and/or water vapour from waste air of a waste air flow to supply air of a supply air flow, wherein this humidifying device is equipped with a plate stack having a longitudinal extent along a longitudinal axis. The plate stack has individual plates that are separate and are touchingly and congruently stacked onto one another in the direction of the longitudinal axis, which for transferring water and/or water vapour from waste air enriched with water and/or water vapour of a waste air flow to supply air enriched with water and/or water vapour of a supply air flow have a fluid-permeable membrane each. Furthermore, this humidifying device is equipped with a housing that forms at least one housing opening, wherein the plate stack is completely inserted in the housing through a housing opening of these housing openings. Furthermore, at least one housing cover is provided, which completely seals the housing openings, in particular, this one housing opening. In the direction of the longitudinal axis between this housing cover and the plate stack, a plate seal, that is, in particular, arranged completely in the interior of the housing, is arranged. It is substantial for the disclosure that this housing cover is designed as closure cover, and that the plate seal is touchingly arranged on this closure cover. The closure cover is completely inserted into the housing through this one housing opening and from the inside, in particular with an inner lateral surface of the housing pointing radially to the inside with respect to the longitudinal axis pressed or wedged or welded or glued to the housing.

Practically, the closure cover can be produced of metal material, plastic material or composite material. Further practically, at least one common air passage can be formed on the closure cover and the plate seal, which completely penetrates the closure cover and the plate seal. The air passage for its part is formed by a hollow cylindrical connector extending parallel or coaxially with respect to the longitudinal axis and a passage opening extending parallel or coaxially with respect to the longitudinal axis. The plate stack can be subjected to the waste air flow or the supply air flow through the air passage. Preferably, the connector is integrally arranged on the closure cover, the passage opening is preferably arranged integrally on the plate seal. Practically, the passage opening, and the connector are oriented aligned with one another, so that they can be flowed through.

The housing formed, in particular, in one or multiple parts is practically formed of at least one housing wall or of multiple in particular materially bonded contiguous housing walls. If the housing is formed of a single housing wall it is practically a cylinder housing that is rotation-symmetrical with respect to an axis of rotation. In the case that the housing is formed of multiple in particular materially bonded contiguous housing walls, it is practically a rectangular housing box that is hollow on the inside or complex in shape. In any case, the housing can be formed of a plastic material, a metal material or a composite material and in particular, within the scope of a manufacturing method that is suitable for the respective material, be cost-effectively produced.

Practically, the humidifying device can be provided for use within a fuel cell system of a vehicle.

Further practically, at least one housing cover can be moulded onto the housing, so that this housing cover and the housing define a one-piece assembly. The term "moulding on" can signify that the said housing cover is produced as a separate component and, for example by gluing or welding, is joined in one piece with the housing in a materially bonded manner. By way of this, a housing opening provided for this housing cover on the housing can be sealed with this housing cover completely and in particular in a fluid-tight manner. However, it can also be provided that the said housing cover and the housing are a joined primary moulding so that they therefore form a monolithic assembly. However, it is practically provided in both cases that in the assembled state of the humidifying device the plate stack can be or are completely inserted into the housing through one or a further one of these housing openings. By way of this, the housing is quasi open towards at least one side. This or this further housing opening, in the assembled state of the humidifying device, is sealed with a or a further housing cover completely, i.e., in a fluid-tight manner. In the case that the one housing cover and the housing are a joined primary moulding and the housing delimits or forms a single housing opening through which the plate stack can be inserted or is inserted into the housing, merely a single housing cover has to be provided. Because of this, the humidifying device can be cost-effectively realised with a relatively low number of components. The measures described above can also be employed with the other housing covers proposed according to an aspect of the disclosure, in particular, regardless of their shaping. In particular, the measures described above can also be employed when the housing cover or the housing covers is realised by a closure cover according to the above description.

In summary, it should be noted: the present disclosure preferentially relates to a humidifying device for transferring water and/or water vapour of waste air of a waste air flow to supply air of a supply air flow. It is substantial for the disclosure that in the compensating chamber of the housing of the humidifying device at least one spreading means is arranged, which spreads the plate stack of the humidifying device and the housing cover closing the housing apart in the direction of the longitudinal axis.

Further important features and advantages of the disclosure are obtained from the drawings and from the associated figure description by way of the drawings.

It is to be understood that the features mentioned above and still to be explained in the following cannot only be used in the respective combinations stated but also in other combinations or by themselves without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure are shown in the drawings and are explained in more detail in the following description, wherein same reference numbers relate to same or similar or functionally same components.

FIGS. 1 to 7 show multiple exemplary embodiments for humidifying devices according to the disclosure, which are each preferentially suitable for use within a fuel cell system of a vehicle and here, as a whole, are marked with a reference number 1. Humidifying devices 1 serve in practice for transferring water and/or water vapour of moist waste air of a waste air flow 2 to dry supply air of a supply air flow 3. For the sake of simplicity, the waste air flow 2 and the supply air flow 3, are merely illustrated in FIG. 1 by a pair of arrows, in fact in practice the waste air flow 2 and the supply air flow 3 snake through the humidifying device 1 intersecting one another multiple times. In practice, the humidifying device 1 according to the disclosure, is interconnected exemplarily with a fuel cell that is not illustrated here such that by means of the humidifying device 1 supply air enriched, i.e., moistened with water and/or water vapour, is provided on the fuel cell via a connector 31 of the humidifying device 1. With the moistened supply air, a polymer electrolyte membrane of the fuel cell can be moistened there for example. During the operation of the fuel cell, oxygen practically reacts with hydrogen giving off energy to form the reaction products water and/or water vapour, which, in the form of moist waste air, flows out of the fuel cell. So as not to lose this waste air from the fuel cell unutilised, it can be made to flow into the humidifying device 1 as waste air flow 2 through a further connector of the humidifying device 1.

The humidifying device 1 for its part is fed with dry supply air via a further connector of the humidifying device 1. In order to moisten the supply air by means of the humidifying device 1, it is provided to transfer water and/or water vapour from the waste air of the waste air flow 2 enriched with water and/or water vapour flowing through the humidifying device 1 to the supply air of the supply air flow 3 to be enriched, for the purpose of which the waste air flow 2 and the supply air flow 3 are conducted past one another crossing multiple times. Following the transfer, the utilised waste air of the waste air flow 2 can flow out of the humidifying device 1 through a further connector of the humidifying device 1 and the moistened supply air utilised at the fuel cell as described above.

Figure 1:
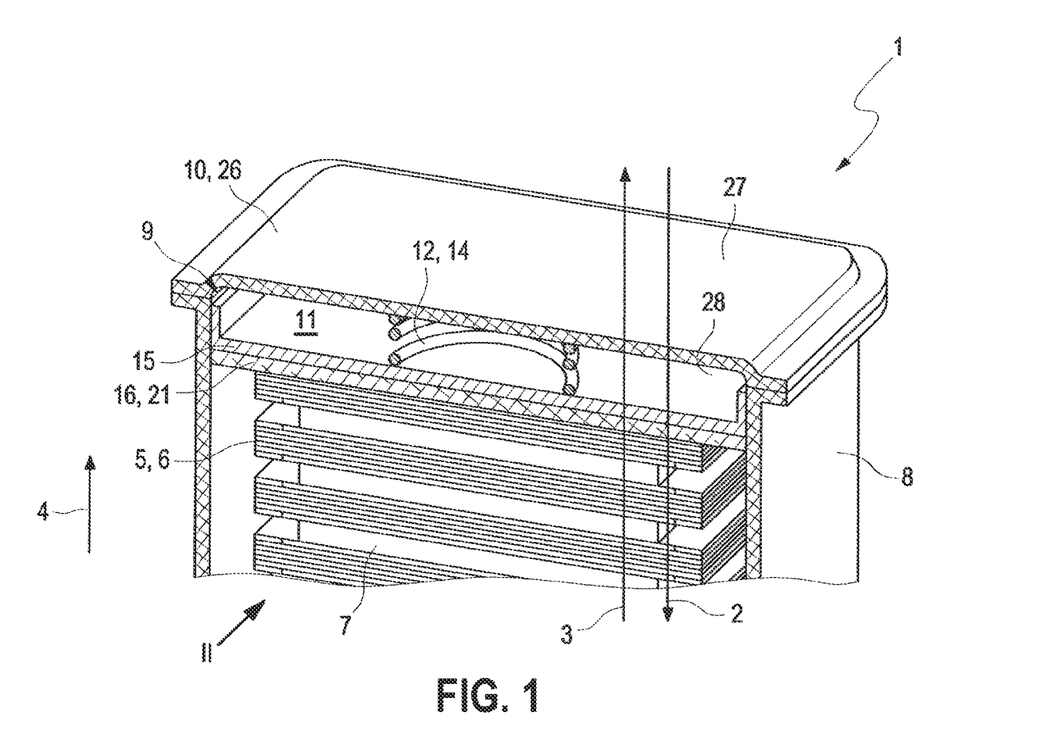
FIG. 1 shows in a perspective view an extract of a humidifying device that is cut in half along a section plane according to a first exemplary embodiment of the disclosure.

In FIG. 1, a perspective view of a humidifying device 1 cut approximately in half, according to a first exemplary embodiment is shown. Initially, it comprises a plate stack 5 having a longitudinal extent along a longitudinal axis 4, which comprises individual plates 6 that are separate and touchingly stacked onto one another in the direction of the longitudinal axis 4. The individual plates 6 each carry a fluid-permeable membrane 7, which serve for transferring water from waste air enriched with water of the waste air flow 2 to supply air to be enriched with water of the supply air flow 3. As is noticeable in FIGS. 1 and 2, the humidifying device 1 comprises a preferentially one-piece housing 8, which exemplarily forms two housing openings 9, of which however merely a single one is shown here. This one housing opening 9 is rectangular in shape although a housing opening 9 configured round is also conceivable in principle. At any rate, the described plate stack 5 is completely inserted into the housing 8 through this housing opening 9, so that it is completely framed, protected and supported by the housing 8 all around.

Figure 2:
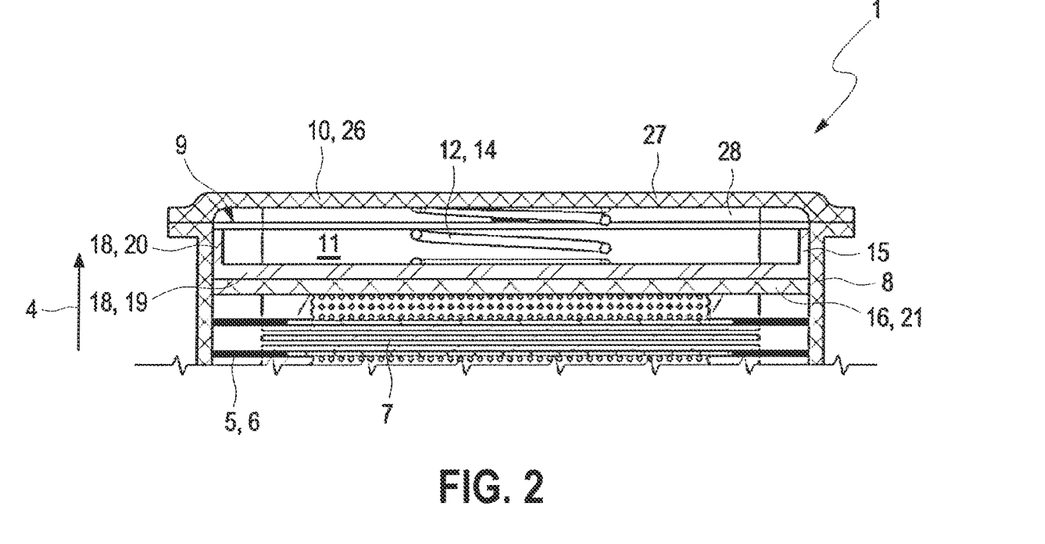
FIG. 2 shows a lateral view of the humidifying device shown in FIG. 1 according to an arrow II entered there.

Furthermore, the humidifying device 1 comprises at least one housing cover 10 that is embodied congruently with at least one of the housing openings 9, which housing cover 10 can close this one housing opening 9 completely, in particular in a fluid-tight manner. In the direction of the longitudinal axis 4, between the housing cover 10 installed on the housing 8 on the housing opening 9 and the plate stack 5 a compensating chamber 11 is defined. A single spreading means 12 is exemplarily received in the compensating chamber 11. This spreading means 12 spreads the plate stack 5 and the housing cover 10 apart in the direction of the longitudinal axis 4.

According to FIGS. 1 and 2 it is exemplarily provided to embody the spreading means 12 in multiple parts, for it is formed by a separate helical compression spring 14 touchingly supporting itself on the housing cover 10, a separate sealing plate 14 and a separate plate seal 16. The compression spring 14 extends in the direction of the longitudinal axis 4 completely through the compensating chamber 11, so that it touchingly supports itself on the one hand on the housing cover 10 and on the other hand on the sealing plate 15. Within the compensating chamber 11, the sealing plate 15 is movably mounted on the housing 8 from the inside in the direction of the longitudinal axis 4. On a large side facing away from the compression spring it carries the plate seal 16, which is produced for example from elastic sealing material. The plate seal 16 is subjected to force via the sealing plate 15 by the compression spring 14 and in the direction of the longitudinal axis 4 touchingly clamped onto the plate stack 5, so that the plate stack 5 is fixed in the direction of the longitudinal axis 4 and so that the plate stack 5 is quasi sealed against the compensating chamber 11.

Figure 3:
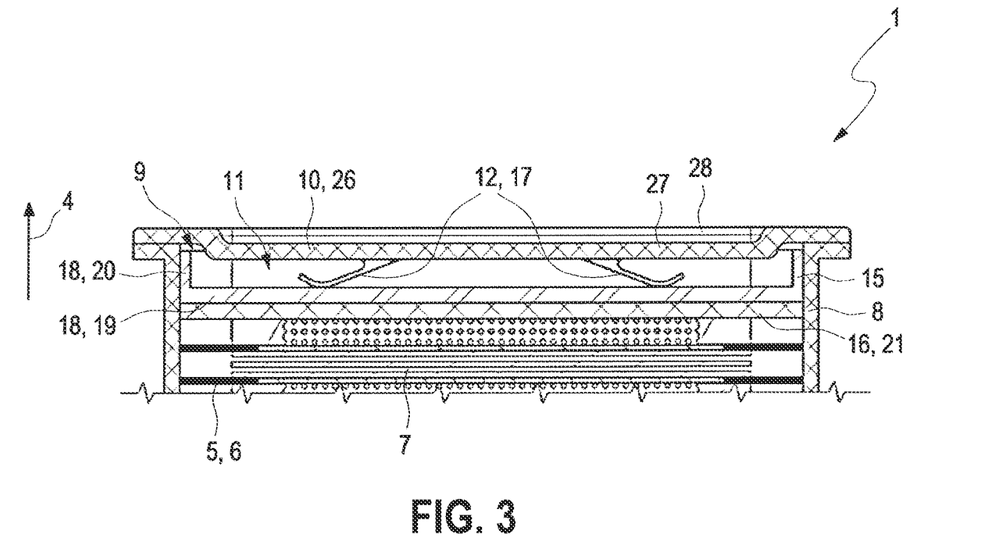
FIG. 3 shows in a lateral view as in FIG. 2 a humidifying device in accordance with a further exemplary embodiment of the disclosure.

FIG. 3 shows in a lateral view, like FIG. 2, a humidifying device 1 according to a further exemplary embodiment of the disclosure. It differs from the preceding exemplary embodiment in particular by a structurally changed spreading means 12. Here, the same is namely formed by a leaf spring 17 integrally embodied with the housing cover 10, a separate sealing plate 15 and a separate plate seal 16, wherein the sealing plate 15 and the plate seal 16 are embodied identically with respect to the preceding exemplary embodiment. In any case it is noticeable that the leaf spring 17 comprises at least two leaf spring legs, each of which extend angularly, in particular each at an angle of approximately 45° with respect to the longitudinal axis 4 or the housing cover 10, through the compensating chamber 11 towards the sealing plate in order to touchingly lie against the sealing plate 15 there and in order to sealingly clamp the plate seal 16 onto the plate stack 5.

The sealing plate 15 shown in FIGS. 1 to 3 is exemplarily formed by a pot body 18 which comprises an obviously rectangular pot base 19, which is framed by a completely surrounding pot wall 20. The pot wall 20 exemplarily projects away from the pot base 19 at a right angle, wherein the plate seal 16 is realised by a flat elastic gasket 21 that is formed in one piece and congruently with the pot base 19 in terms of area.

Figure 4:
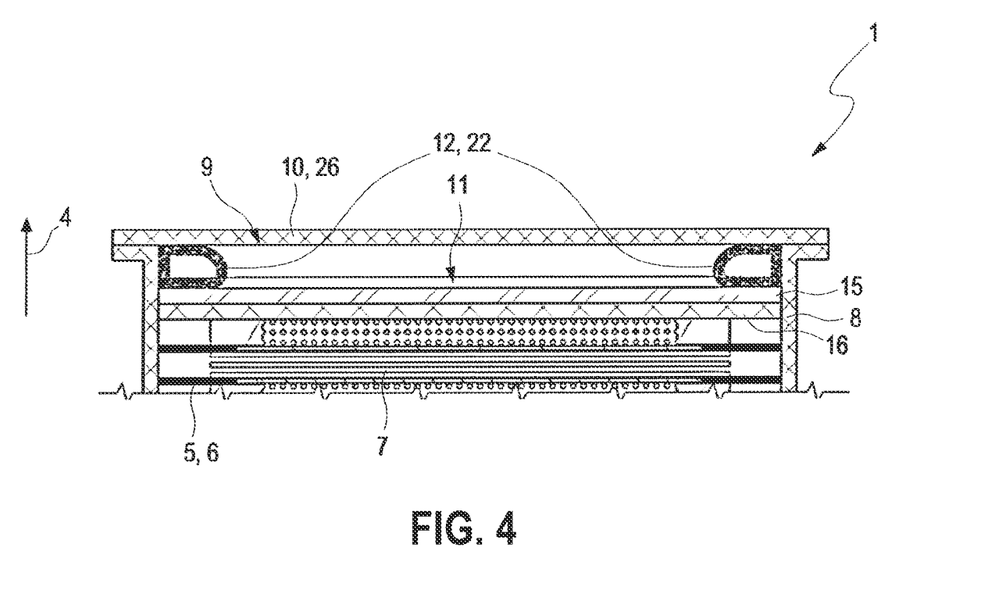
FIG. 4 shows in a lateral view as in FIGS. 2 and 3, a humidifying device in accordance with a further exemplary embodiment of the disclosure.

FIG. 4 shows in a lateral view, like FIGS. 2 and 3, a humidifying device 1 according to the disclosure in accordance with a further exemplary embodiment. This too differs from the preceding exemplary embodiments in particular through a structurally modified spreading means 12. Here, the same is formed by a separate elastic hose seal 22, a separate sealing plate 15 and a separate plate seal 16. The hose seal 22 is equipped with elastic material properties and touchingly arranged on the housing cover 10, on the housing 8 and on the sealing plate 15. It runs completely around the compensating chamber 11 for example along the housing opening 9 and expands in the direction of the longitudinal axis 4 through the compensating chamber 11 in order to lie against the sealing plate 15 in a touchingly supported manner. Within the compensating chamber 11, the sealing plate 15 is movably mounted on the housing 8 from the inside in the direction of the longitudinal axis 4 and carries the plate seal 16 on a large side facing away with respect to the hose seal 22. This plate seal 16 is subjected to force via the sealing plate 15 by the hose seal 22, as a result of which the plate seal 16 is touchingly clamped onto the plate stack 5. By way of this, the plate stack 5 can quasi be sealed against the compensating chamber 11.

Figure 5:
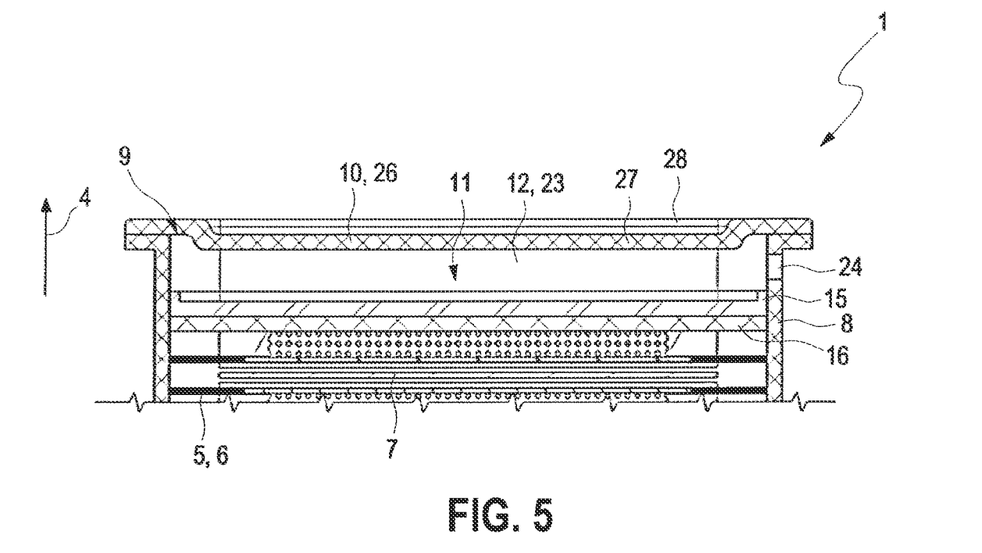
FIG. 5 shows in a lateral view as in FIGS. 2 to 4, a humidifying device in accordance with a further exemplary embodiment of the disclosure.

FIG. 5 shows in a lateral view, like FIGS. 2 to 4, a humidifying device 1 in accordance with a further exemplary embodiment of the disclosure, wherein the difference with respect to the preceding exemplary embodiments here lies in that the spreading means 12 is structurally modified. According to FIG. 5, the spreading means 12 is namely formed by a cured sealant 23, by a separate sealing plate 15 and by a separate plate seal 16. Furthermore, the housing 8, in contrast with the preceding housings 8, has at least one filling opening 24. Through this filling opening 24, liquid (uncured) sealing 23 can be flowed into the compensating chamber 11 as part of the assembly of the humidifying device 1 in particular so that it completely fills up the compensating chamber 11. By way of this, it is ensured that the sealant 23 is touchingly arranged or flowed-on, on the one hand on the sealing plate 15 arranged within the compensating chamber 11 and on the other hand on the housing cover 10 and on the housing 8. The liquid sealant 23 can cure, automatically or, externally activated, in a volume-expanding manner so that in the cured state it spreads apart the sealing plate 15 and the housing cover 10 in the direction of the longitudinal axis 4. Furthermore it can completely seal the filling opening 24. By way of this, the plate seal 16 arranged on the sealing plate 15 can, subjected to force, lie against the plate stack 5 in order to quasi seal the plate stack 5 against the compensating chamber 11.

The preceding exemplary embodiments have in common that the housing cover or housing covers 10 are each formed by a round or square flat rim part 26 with a centrally projecting cover curvature 27, see FIGS. 1 and 2. The cover curvature 27 and the flat rim part 26 delimit or form a curvature volume 28. According to FIGS. 1 and 2, it is noticeable that the housing cover 10, in the assembled state of the humidifying device 1, is arranged on the housing 8 so that the cover curvature 27 projects away from the housing 8 in the direction of the longitudinal axis 4. By way of this, the curvature volume 28 and the volume of the compensating chamber 11 can add up, i.e., become larger. Furthermore, it can also be provided, according to FIGS. 3 and 5, that the housing cover 10, in the assembled state of the humidifying device 1, is arranged on the housing 8 so that the cover curvature 27 projects in the direction of the longitudinal axis 4 towards the plate stack 5 into the housing 8. By way of this, the volume of the compensating chamber 11 diminishes by the curvature volume 28. Only the humidifying device 1 according to the exemplary embodiment illustrated in FIG. 4 has a flat housing cover 10.

Figure 6:
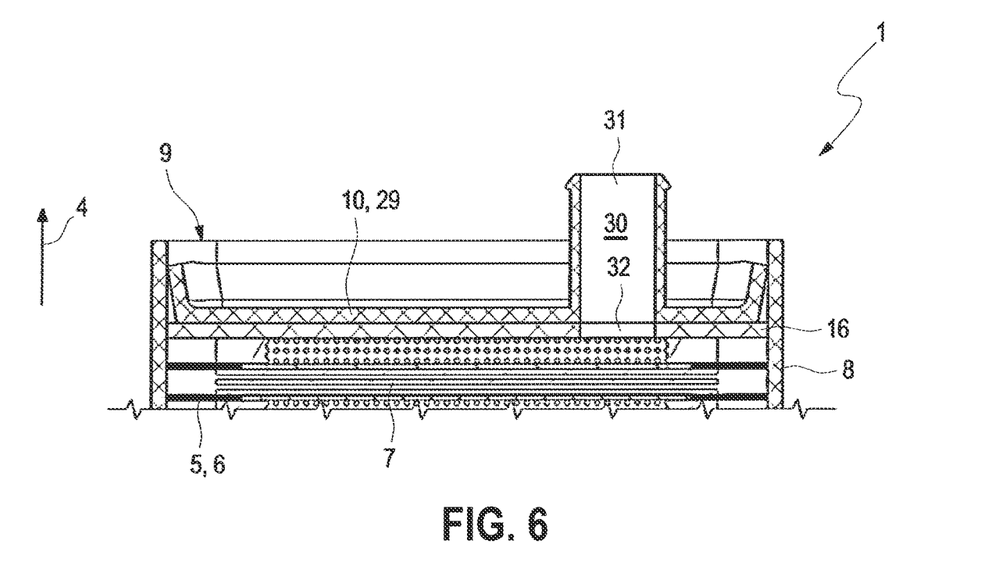
FIG. 6 shows in a lateral view as in FIGS. 2 to 5, a humidifying device in accordance with a further exemplary embodiment of the disclosure.

Furthermore, FIG. 6 shows in a lateral view, as in FIGS. 2 to 5, a humidifying device 1 in accordance with a further exemplary embodiment of the disclosure. The same, too, differs from the preceding exemplary embodiments. Here, it is exemplarily provided that the spreading means 12 is completely replaced by a housing cover 10 or formed by the same. For this purpose, the housing cover 10 is formed as closure cover 29 and inserted or slid into the housing 8 through the housing opening 9 and furthermore pressed or wedged or welded or glued to the housing 8 from the inside. On one of its two large sides, the closure cover 29 carries a plate seal 16 which in the installed state of the closure cover 29 is touchingly laid against the plate stack 5 in order to seal the plate stack 5 against the surroundings. In FIG. 6, it is also noticeable that the closure cover 29 and the plate seal 16 are equipped with a single air passage 30, which completely penetrates the same along the longitudinal axis 4. The air passage 30 serves for conducting through the waste air flow 2 or the supply air flow 3 mentioned at the outset. The air passage 30 is exemplarily formed by a hollow cylindrical connector 31 that extends parallel with respect to the longitudinal axis 4 and a passage opening 32 which extends parallel with respect to the longitudinal axis. The connector 31 for its part is integrally formed on the closure cover 29, the passage opening 32 for its part is integrally formed on the plate seal 16. The connector 31 and the passage opening 32 are orientated aligned with one another so that fluid can flow through.

Figure 7:
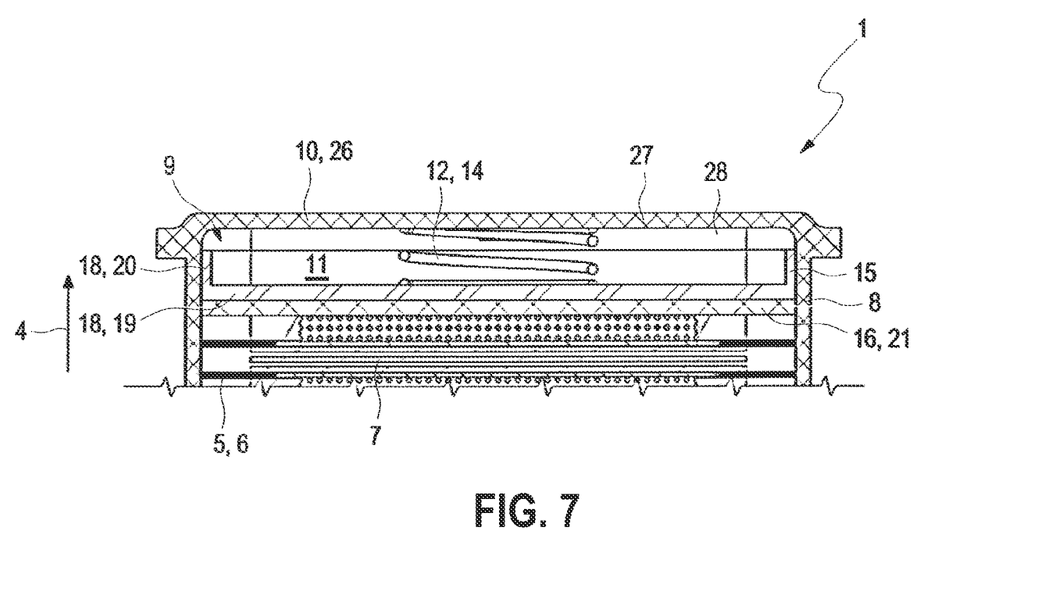
FIG. 7 shows a humidifying device in a lateral view substantially carried out analogous to FIG. 2 in accordance with a further exemplary embodiment of the disclosure.

Finally, FIG. 7 shows a humidifying device 1 according to a further exemplary embodiment, which is substantially constructed analogously to the humidifying device 1 illustrated in FIGS. 1 and 2, so that the above explanations in this regard can also be incorporated here. The humidifying device 1 according to FIG. 7 differs from the preceding exemplary embodiments by the particularity described in the following that the housing cover 10 is moulded onto the housing 8. By way of this, the housing cover 10 and the housing 8 form a one-piece monolithic assembly. Exemplarily, the housing cover 10 and the housing 8 are produced by a common primary moulding, for example by means of injection moulding to near the final contour. In order for the said plate stack 7 to be insertable into the housing 8 it is provided, furthermore, but not illustrated in FIG. 7, that the housing 8 comprises at least one housing opening through which the plate stack 5 can be completely inserted into the housing 8. By way of this, the housing is quasi open towards at least one side. This housing opening, in the assembled state of the humidifying device 1, with a housing cover, is completely sealed, i.e., in particular in a fluid-tight manner. Because of this, the humidifying device 1 can be cost-effectively realised with a relatively low number of components.

It is understood that the foregoing description is that of the exemplary embodiments of the disclosure and that various changes and modifications may be made thereto without departing from the spirit and scope of the disclosure as defined in the appended claims.

What is claimed is:

1. A humidifying device for transferring water, contained in waste air of a waste air flow, from the waste air to supply air of a supply air flow for a fuel cell, the humidifying device comprising:
 a plate stack having a longitudinal extent along a longitudinal axis, the plate stack comprising separate individual plates that are touchingly stacked onto one another in the direction of the longitudinal axis, wherein each of the separate individual plates, for transferring the water from the waste air of the waste air flow enriched with the water to the supply air of the supply air flow to be enriched with the water, comprises a fluid-permeable membrane;
 a housing, which forms at least one housing opening wherein the plate stack is completely inserted into the housing through a housing opening of the housing;
 at least one housing cover, which completely seals the one housing opening, wherein in the direction of the longitudinal axis, a compensating chamber is defined between the housing cover and the plate stack; and a spreader arranged in the compensating chamber and configured to spread apart the plate stack and the housing cover in the direction of the longitudinal axis, wherein the spreader comprises a separate compression spring, a separate sealing plate, and a separate plate seal, wherein the separate compression spring touchingly supports itself on the housing cover, wherein the compression spring extends in the direction of the longitudinal axis through the compensating chamber and touchingly supports itself on the sealing plate, wherein, within the compensating chamber, the sealing plate is movably mounted on the housing from the inside of the housing in the direction of the longitudinal axis, wherein, on a large side facing away from the compression spring, the sealing plate carries the plate seal, wherein the plate seal, subjected to force by the compression spring, touchingly lies against the plate stack and seals the plate stack against the compensating chamber, wherein the sealing plate is formed by a pot body, which has a round or square pot base, which is framed by a pot wall surrounding the pot base completely or at least in section, which pot wall projects away from the pot base at a right angle, and wherein the plate seal is realized through a flat round or square elastic gasket that is formed in one piece and congruently with the pot base in terms of area.

2. The humidifying device according to claim 1, wherein the spreader fixes the plate stack non-positively and positively on the housing with respect to the longitudinal axis.

3. The humidifying device according to claim 1, wherein the spreader non-positively and positively supports itself on the plate stack and/or on the housing cover.

4. The humidifying device according to claim 1, wherein the spreader is integrally embodied or connected to the plate stack and/or to the housing cover in a positive-locking manner.

5. The humidifying device according to claim 1, wherein the spreader forms a separate component with respect to the housing, with respect to the plate stack, and with respect to the housing cover.

6. The humidifying device according to claim 1, wherein the compensating chamber is framed transversely to the longitudinal axis by a housing portion of the housing at least in sections, and wherein the spreader non-positively and positively supports itself on the respecting housing portion.

7. The humidifying device according to claim 1, wherein the spreader comprises at least one leaf spring that is integrally embodied with the housing cover, a separate sealing plate and a separate plate seal, wherein the at least one leaf spring extends angularly with respect to the longitudinal axis through the compensating chamber towards the sealing plate and touchingly supports itself on the sealing plate, wherein within the compensating chamber, the sealing plate is movably mounted on the housing from the inside in the direction of the longitudinal axis, and on a large side facing away from the spring, the sealing plate carries the plate seal, and wherein the plate seal, subjected to force by the leaf spring, touchingly lies against the plate stack and seals the plate stack against the compensating chamber.

8. The humidifying device according to claim 1, wherein the housing cover is a round or square flat rim part with central projecting cover curvature, wherein the cover curvature and the flat rim part delimit a curvature volume, wherein the housing cover in the assembled state of the humidifying device is arranged on the housing so that the cover curvature projects away from the housing in the direction of the longitudinal axis, and wherein the curvature volume enlarges the volume of the compensating chamber, or wherein the housing cover, in the assembled state of the humidifying device, is arranged on the housing such that the cover curvature projects towards the plate stack into the housing in the direction of the longitudinal axis, and wherein the curvature volume diminishes the volume of the compensating chamber.

9. The humidifying device according to claim 1, wherein the separate compression spring is a helical compression spring.

10. A humidifying device for transferring water, contained in waste air of a waste air flow, from the waste air to supply air of a supply air flow for a fuel cell, the humidifying device comprising:

a plate stack having a longitudinal extent along a longitudinal axis, the plate stack comprising separate individual plates that are touchingly stacked onto one another in the direction of the longitudinal axis, wherein each of the separate individual plates, for transferring the water from the waste air of the waste air flow enriched with the water to the supply air of the supply air flow to be enriched with the water, comprises a fluid-permeable membrane;

a housing, which forms at least one housing opening, wherein the plate stack is completely inserted into the housing through a housing opening of the housing;

at least one housing cover, which completely seals the one housing opening, wherein in the direction of the longitudinal axis, a compensating chamber is defined between the housing cover and the plate stack; and a spreader arranged in the compensating chamber and configured to spread apart the plate stack and the housing cover in the direction of the longitudinal axis, wherein the spreader comprises a separate elastic hose seal, a separate sealing plate and a separate plate seal, wherein the hose seal touchingly supports itself on the housing cover and on the housing and transversely with respect to the longitudinal axis completely surrounds the longitudinal axis, wherein the hose seal expands in the direction of the longitudinal axis through the compensating chamber and touchingly supports itself on the sealing plate, wherein within the compensating chamber the sealing plate is movably mounted on the housing from the inside in the direction of the longitudinal axis and on a large side facing away with respect to the hose seal carries the plate seal, and wherein the plate seal, subjected to force by the hose seal, touchingly lies against the plate stack and seals the plate stack against the compensating chamber.

11. A humidifying device for transferring water, contained in waste air of a waste air flow, from the waste air to supply air of a supply air flow for a fuel cell, the humidifying device comprising:

a plate stack having a longitudinal extent along a longitudinal axis, the plate stack comprising separate individual plates that are touchingly stacked onto one another in the direction of the longitudinal axis, wherein each of the separate individual plates, for transferring the water from the waste air of the waste air flow enriched with the water to the supply air of the supply air flow to be enriched with the water, comprises a fluid-permeable membrane;

a housing, which forms at least one housing opening, wherein the plate stack is completely inserted into the housing through a housing opening of the housing;

at least one housing cover, which completely seals the one housing opening, wherein in the direction of the longitudinal axis, a compensating chamber is defined between the housing cover and the plate stack; and a spreader arranged in the compensating chamber and configured to spread apart the plate stack and the housing cover in the direction of the longitudinal axis, wherein the spreader is formed by a cured sealant, a separate sealing plate and a separate plate seal, wherein the housing comprises a filling opening, through which the liquid sealant is flowed into the compensating chamber, wherein the liquid sealant completely fills up the compensating chamber, so that on the one hand it is touchingly arranged on the sealing plate arranged within the compensating chamber and on the other hand on the housing cover and on the housing, wherein the liquid sealant is volume-expandingly cured, so that the cured sealant spreads apart the sealing plate and the housing cover in the direction of the longitudinal axis and seals the compensating chamber and the filling opening, and wherein on the sealing plate the plate seal is arranged, which, subjected to force by the cured sealant, touchingly lies against the plate stack and seals the plate stack against the compensating chamber.

* * * * *